US008514283B2

(12) United States Patent
Nam et al.

(10) Patent No.: US 8,514,283 B2
(45) Date of Patent: Aug. 20, 2013

(54) AUTOMATIC VISION SENSOR PLACEMENT APPARATUS AND METHOD

(75) Inventors: Yun Young Nam, Suwon-si (KR); We Duke Cho, Seongnam-si (KR); Uin Burn, Suwon-si (KR)

(73) Assignee: Ajou University Industry Cooperation Foundation, Gyeonggi-do (KR)

( * ) Notice: Subject to any disclaimer, the term of this patent is extended or adjusted under 35 U.S.C. 154(b) by 340 days.

(21) Appl. No.: 12/885,944

(22) Filed: Sep. 20, 2010

(65) Prior Publication Data

US 2012/0069190 A1 Mar. 22, 2012

(51) Int. Cl.
H04N 7/18 (2006.01)
H04N 5/225 (2006.01)
(52) U.S. Cl.
USPC ............................ 348/159; 348/171; 348/172
(58) Field of Classification Search
USPC ......................................... 348/159, 171, 172
See application file for complete search history.

(56) References Cited

U.S. PATENT DOCUMENTS

2006/0010028 A1* 1/2006 Sorensen .................... 705/10
2006/0268108 A1* 11/2006 Abraham ..................... 348/143
2008/0159634 A1* 7/2008 Sharma et al. .............. 382/224

FOREIGN PATENT DOCUMENTS

KR 10-2009-0024946 3/2009

OTHER PUBLICATIONS

E. Horster et al.; "On the Optimal Placement of Multiple Visual Sensors"; VSSN '06 Proceedings of the 4th ACM international workshop on Video surveillance and sensor networks; 2006; pp. 111-120.*
Indu et al.; "Optimal Sensor Placement for Surveillance of Large Spaces"; Third ACM/IEEE International Conference on Distributed Smart Cameras, 2009, ICDSC 2009; Aug. 30, 2009-Sep. 2, 2009; pp. 1-8.*
Bodor et al.; "Optimal Camera Placement for Automated Surveillance Tasks"; Journal of Intelligent and Robotic Systems; vol. 50 Issue 3, Nov. 2007; pp. 257-295.*
El-Alfy et al.; "Assigning Cameras to Subjects in Video Surveillance Systems"; 2009 IEEE International Conference on Robotics and Automation; Kobe, Japan, May 12-17, 2009.*
Burn et al. (2010) "Agent-based Automatic Camera Placement for Video Surveillance Systems." Journal of Korean Society for Internet Information, 11(1):105-118 (English translation of the index of article attached).

* cited by examiner

Primary Examiner — Lynn Feild
Assistant Examiner — Lin Liu
(74) Attorney, Agent, or Firm — Harness, Dickey & Pierce, P.L.C.; Anthony G. Fussner; Kisuk Lee

(57) ABSTRACT

There are provided an automatic vision sensor placement apparatus and method which analyze static spatial information in various aspects, calculate priorities of spaces using an agent that models the movement pattern of a user, suggest a method of effectively covering a given space, provide a camera placement method to appropriately install cameras with various levels of performance in a specified space, and calculate the optimal number of cameras to be installed based on installation cost.

3 Claims, 16 Drawing Sheets

AUTOMATIC VISION SENSOR PLACEMENT APPARATUS AND METHOD

FIELD

The present disclosure relates to an automatic vision sensor placement apparatus and method. More particularly, it relates to an automatic vision sensor placement apparatus and method which analyze static spatial information in various aspects, calculate priorities of spaces using an agent that models the movement pattern of a user, suggest a method of effectively covering a given space, provide a camera placement method to appropriately install cameras with various levels of performance in a specified space, and calculate the optimal number of cameras to be installed based on installation cost.

BACKGROUND

"Ubiquitous computing" is a concept first introduced by Mark Weiser in 1993. Since then, it has been used as a keyword in various technical and cultural contexts and presented in various forms.

The rapid development of information technology (IT) since the onset of the information age has brought about a ubiquitous era in which a networking service can be provided to users without time and space constraints. In a ubiquitous environment, a service provider must be able to identify a user's needs and surroundings on its own and provide a service, which meets the user's needs, at the right time and without the intervention of the user.

A computing system that applies a computing function to an environment and an object and connects them through a network is an essential infrastructure environment for the implementation of a ubiquitous service.

To build a ubiquitous infrastructure environment in a space by removing space constraints, blocks of space have been created in the form of intelligent spaces.

Intelligent spaces build a close and extensive communication system on a network in order to create an integrated ubiquitous service. However, various elements that form each intelligent space are specific only to a corresponding intelligent space. This is because not all intelligent spaces are designed with the same standards, and infrastructures, devices, etc. introduced into these intelligent spaces are developed with various standards and different levels of technology.

Before creating intelligent spaces, project planners design a detailed project execution process and project deliverables through a planning process. However, due to the above-mentioned characteristics of intelligent spaces, the principle of creating the intelligent spaces changes according to the purpose, scale, and cost of each intelligent space. Accordingly, it is inevitable to modify requirements for creating each intelligent space.

An intelligent space integrates various levels of technology. To create an intelligent space, knowledge about the development of intelligent objects, the principle of space design, the implementation of an intelligent space service, and the like are required. However, it is very difficult to have expertise on such diverse fields. From the perspective of intelligent space design that puts emphasis on purpose and service, it is also not necessary for a project planner to have all the technical knowledge about the construction of these infra-structures.

In the aspect of intelligent space design, a vision algorithm, which is related to a security service such as tracking and surveillance, depends on devices and space more than any other conventional service technologies. Thus, the vision algorithm has a development structure that cannot allow a space designer, a service developer, and a device developer to work independently.

In the aspect of intelligent space development, this unnecessary connection between the space designer, the service developer, and the device developer has been pointed out as a major cause of development efficiency reduction. Due to this connection, research on vision technology and sensor structure placement has mostly been conducted in terms of vision algorithms and in a shortsighted manner or by technology developers, but not by space designers or project planners.

Furthermore, research on image processing of a video surveillance system has mostly focused on the development of hardware with stable and efficient performance and the development of motion- or object-tracking algorithms.

However, camera placement should be considered that involves measuring the total coverage of cameras through camera cooperation and be considered with a higher priority in system design than the performance of hardware and each algorithm. It cannot be verified just with experiments such as a simple algorithm performance evaluation test conducted in a controlled environment.

SUMMARY

The following description relates to an automatic vision sensor placement apparatus and method which design a field of view (FOV) of a camera in space, model movement patterns of virtual agents, calculate priorities of spaces based on the modeled movement patterns, and supplement space coverage with minimum cost based on the calculated priorities of the spaces.

In an embodiment, there is provided an automatic vision sensor placement apparatus including: a space modeling unit modeling a specified space as a two-dimensional (2D) grid map; a priority space extraction unit expressing the space priority of each cell of the grid map in a numerical value based on an amount of movement of an agent in a first area of the grid map and a probability that the agent will move from the first area to a second area; a suitability extraction unit extracting the suitability of a vision sensor at each location on the grid map based on the sum of space priority values of cells within an FOV of the vision sensor and the performance and cost of the vision sensor; and a placement location selection unit calculating the number of vision sensors to be placed based on a maximum vision sensor placement cost and minimum space coverage and selecting locations, at which the vision sensor is to be placed, in order of highest to lowest suitability of the vision sensor, wherein the FOV of the vision sensor is defined by a viewing distance d, available angle a, and position angle $\Phi$ of the vision sensor at a specified coordinate point, and the minimum space coverage is the proportion of a minimum area that can be monitored by the vision sensor in the specified space.

In another embodiment, there is provided an automatic vision sensor placement method including: modeling a specified space as a 2D grid map; expressing the space priority of each cell of the grid map in a numerical value based on an amount of movement of an agent in a first area of the grid map and a probability that the agent will move from the first area to a second area; extracting the suitability of a vision sensor at each location on the grid map based on the sum of space priority values of cells within an FOV of the vision sensor and the performance and cost of the vision sensor; and calculating the number of vision sensors to be placed based on a maximum vision sensor placement cost and minimum space coverage and selecting locations, at which the vision sensor is to be placed, in order of highest to lowest suitability of the vision sensor, wherein the FOV of the vision sensor is defined by a viewing distance d, available angle a, and position angle Φ of the vision sensor at a specified coordinate point, and the minimum space coverage is the proportion of a minimum area that can be monitored by the vision sensor in the specified space.

Other features and aspects will be apparent from the following detailed description, the drawings and the claims. The description and specific examples in this summary are intended for purposes of illustration only and are not intended to limit the scope of the present disclosure.

DRAWINGS

Figure 1:
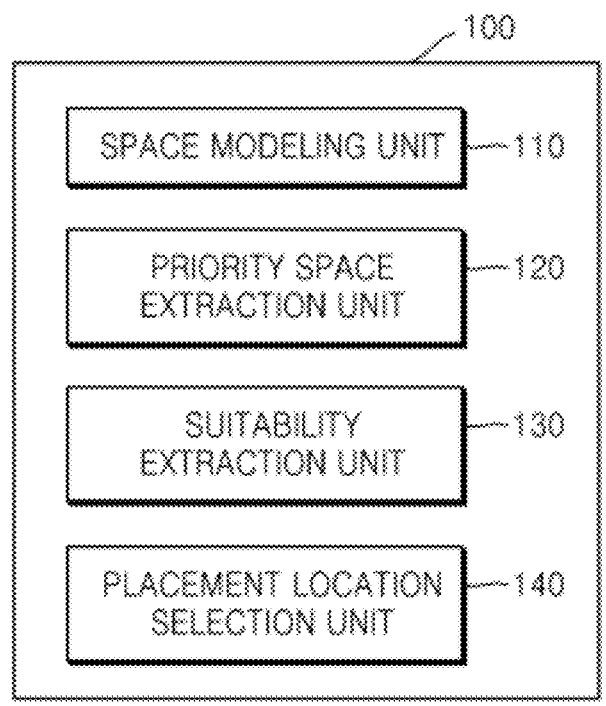
FIG. 1 is a diagram illustrating the configuration of an automatic vision sensor placement apparatus according to the present disclosure.

Throughout the drawings and the detailed description, unless otherwise described, the same drawing reference numerals will be understood to refer to the same elements, features, and structures. The relative size and depiction of these elements may be modified for clarity, illustration, and convenience.

DETAILED DESCRIPTION

The present invention will now be described more fully with reference to the accompanying drawings, in which exemplary embodiments of the invention are shown.

FIG. 1 is a diagram illustrating the configuration of an automatic vision sensor placement apparatus 100 according to the present disclosure.

The automatic vision sensor placement apparatus 100 according to the present disclosure is designed to automatically select locations, at which vision sensors (such as cameras) are to be placed, in an area being developed as a new town or an area that requires the installation of vision sensors.

The automatic vision sensor placement apparatus 100 according to the present disclosure includes a space modeling unit 110, a priority space extraction unit 120, a suitability extraction unit 130, and a placement location selection unit 140.

The space modeling unit 110 models a specified space, in which vision sensors are to be placed, as a two-dimensional (2D) grid map.

The priority space extraction unit 120 extracts a priority area based on the amount of movement of an agent in a specified area of the 2D grid map and a probability that the agent will move from a starting point to a destination.

The suitability extraction unit 130 calculates the suitability of a vision sensor at a specified location on the 2D grid map by identifying a maximum area (i.e., maximum space coverage) that can be monitored by the vision sensor in the extracted priority area and dividing the identified maximum area by the cost of the vision sensor.

The placement location selection unit 140 calculates the number of vision sensors to be placed based on a maximum vision sensor placement cost and minimum space coverage and selects locations, at which the vision sensor is to be placed, in order of highest to lowest suitability of the vision sensor. Here, the minimum space coverage refers to the proportion of a minimum area that can be monitored by a vision sensor in a specified space.

Figure 2:
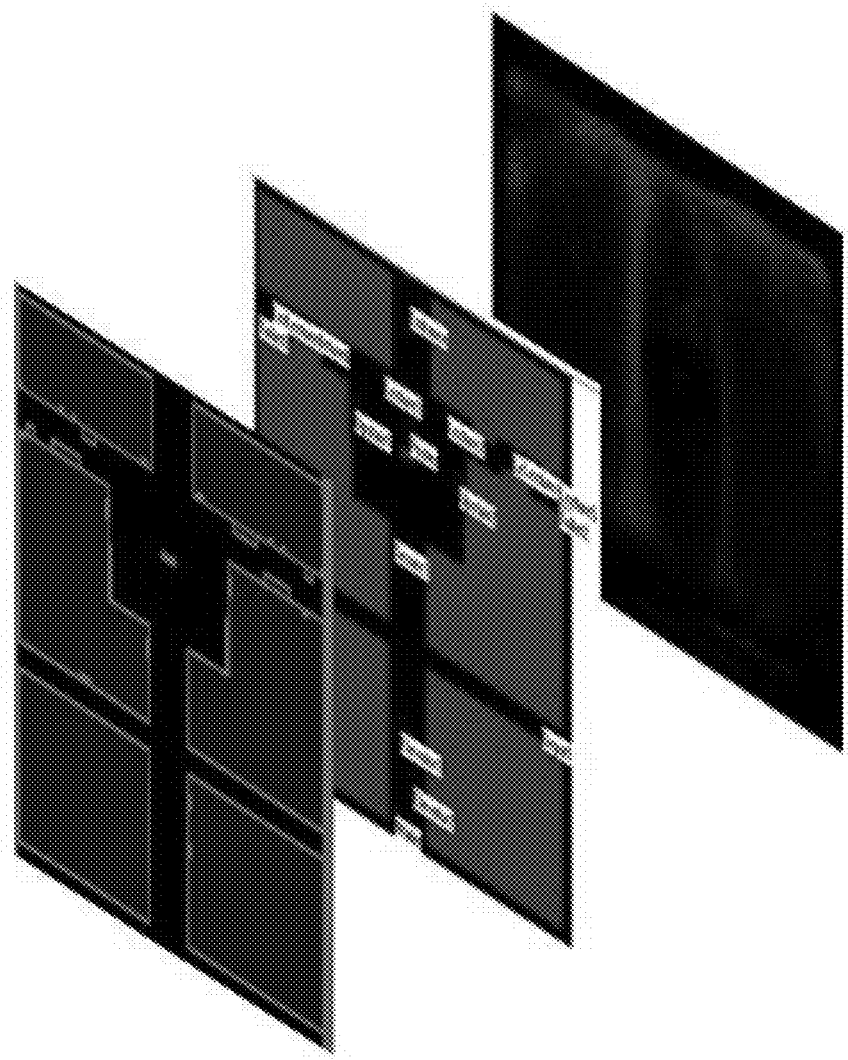
FIG. 2 is a diagram illustrating the layer configuration of a space modeling unit included in the automatic vision sensor placement apparatus of FIG. 1.

FIG. 2 is a diagram illustrating the layer configuration of the space modeling unit 110 included in the automatic vision sensor placement apparatus 100 of FIG. 1.

Referring to FIG. 2, the space modeling unit 110 of the automatic vision sensor placement apparatus 100 includes a wall/spacer layer (a) and an area layer (b). The wall/spacer layer (a) contains information about walls and spaces that divide the geography of a space in which vision sensors are to be placed, and the area layer (b) contains information about the amount of movement of a user in a specified area of a 2D grid map and information about a probability that the user will move from a starting point to a destination.

Specifically, the wall/space layer (a) contains information about walls and spaces that separate a walkable space from a non-walkable space in an area in which vision sensors are to be placed. This information may be applied to an agent's pathfinding algorithm.

The area layer (b) contains information about the amount of movement of a user in a specified area of a 2D grid map and information about a probability that the user will move from a starting point to a destination.

Therefore, the area layer (b) contains area attribute information needed to extract a priority area. Examples of the area attribute information include location, range, the amount of movement of a user, and a probability that the user will move from a starting point to a destination.

A movement probability refers to a probability that a user arriving at a second area (a destination) from a first area (a starting point) on a 2D grid map will select another destination)). Here, a probability that a user will move from a starting point to a destination is calculated based on (n−1) destinations excluding a current destination, at which the user has arrived, among a total number n of destinations. Each of first and second areas is represented by a circle with a radius "r" from a specified location on the 2D grid map.

The space modeling unit 110 of the automatic vision sensor placement apparatus 100 further includes a priority layer (c).

The priority layer (c) is a database of numerical values representing space priorities that are determined based on an agent's pathfinding. The space priorities are updated based on the movement pattern of the agent and are used as important information for finally determining locations at which vision sensors (i.e., cameras) are to be placed.

Figure 3A:
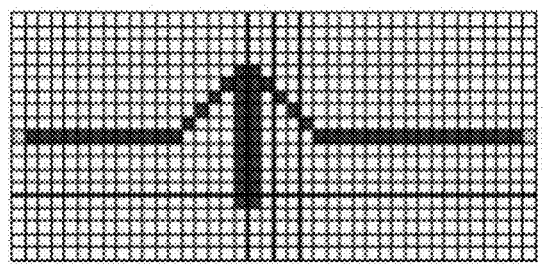
FIGS. 3A and 3B are diagrams illustrating an agent's movement pattern modeled by the automatic vision sensor placement apparatus of FIG. 1.
Figure 3B:
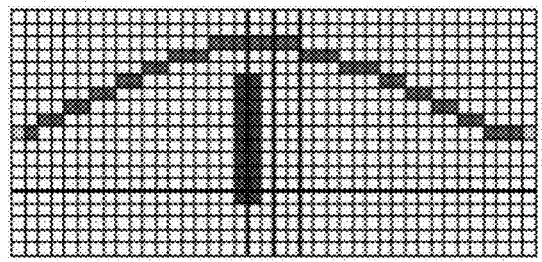

FIGS. 3A and 3B are diagrams illustrating an agent's movement pattern modeled by the automatic vision sensor placement apparatus 100 of FIG. 1.

In the present disclosure, the movement pattern of an agent is simulated based on the assumption that the agent is a user. Thus, the agent virtually embodies all possible movements of the user in real space.

A user in real space takes too various paths to predict even when moving from the same starting point to the same destination. This is because the user's priority in selecting a path varies according to diverse factors such as the user's emotion, prior knowledge, and surroundings.

Referring to FIGS. 3A and 3B, a path (shown in FIG. 3A) found using an artificial intelligence-based pathfinding algorithm that gives priority to a shortest path is significantly different from a path (shown in FIG. 3B) selected by a user. This is because a conventional pathfinding algorithm considers neither an agent's local field of view by assuming that the agent has learned regional geographical information nor the cost of the agent's change of direction. Thus, the path shown in FIG. 3A is in the form of a bent line that is very adjacent to an obstacle (a wall).

To minimize the difference between a path actually traveled by a user and a path selected by an agent, the present invention additionally computes various forms of paths by estimating available routes around a route found using a pathfinding algorithm.

In most cases, each possible area to be selected by a user is located at one of the positions on various paths including the above derivative routes.

An agent initially examines all possible areas to move to from all destinations and performs an inference-based pathfinding simulation in the following sequence:
1. If no unselected destination is available, terminate the simulation. If not, select a destination at a current location based on a probability distribution.
2. Find a path from the current location to the selected destination by using a pathfinding algorithm.
3. Expand the found path using a path expansion algorithm and based on the area attribute information.
4. Compute space priorities of all possible areas to move to on the found path and all paths, which are created by expanding the found path, based on an area probability distribution and update priority area information.
5. Set the selected destination as a current location and return to step 1.

Finding a path is a process of making inferences to find the most efficient sequence of movement from a starting point to a destination. That is, pathfinding involves not only a physical action of finding a destination but also a psychological process of perceiving, determining, and examining environmental information that is given in the process of conducting the physical action.

Factors that are considered in pathfinding include geography-related environmental factors and purpose factors that cause an individual to select an optimal path from various paths based on his or her preference. Emotional factors of the individual also greatly affect pathfinding.

There are many examples of research in which the environmental factors are modeled for use in simulations. However, there are few examples of research in which the emotional factors are applied to a pathfinding algorithm. This is because the emotional factors fall within the domain of artificial intelligence which concerns an individual's ability to learn, infer, and perceive as well as the individual's ability to comprehend a natural language. Also, in most research studies, it is ineffective to apply such ambiguous and uncertain factors to simulations.

An A* algorithm, which is one of pathfinding algorithms used in the present invention, also excludes the emotional factors. The A* algorithm makes inferences with the aim of finding the shortest and least-cost path.

The A* algorithm is based on a heuristic search algorithm and a graph search algorithm. In the graph search algorithm, map elements or selection elements connected in a tree structure according to criteria for selection in pathfinding are defined as nodes.

The steps involved in the A* algorithm are as follows:
1. Add start node A to list OPEN and store start node A in initial search tree T.
2. Define empty list CLOSED.
3. Check whether OPEN is empty. When OPEN is empty, return failure.
4. Select a first node in OPEN, label the selected node "An," and add node An to CLOSED.
5. When node An is a goal node, track and return a path from A to An.
6. Store all nodes connected to node An in search tree T.
7. Add the nodes connected to node An to OPEN.
8. Reorganize the content of OPEN based on heuristic and other factor values.
9. Return to step 3.

The present invention considers a 2D grid map in eight different directions based on the A* algorithm and applies the A* algorithm to an agent's pathfinding by defining a heuristic evaluation function as follows.

$$F = G + H, \quad (1)$$

where G is the total cost of movement from a start node to a current node, and H is the total cost of movement from the current node to a goal node, which ignores obstacles between the two nodes.

Therefore, F, which is the sum of G and H, is a final criterion used in the A* algorithm to determine priority in pathfinding. The cost of movement is set to 1 for up, down, right, and left directions and is set to 1.4 for a diagonal direction. In addition, the cost (H) of movement between the start node and the current node is calculated using a Manhattan method.

Figure 4:
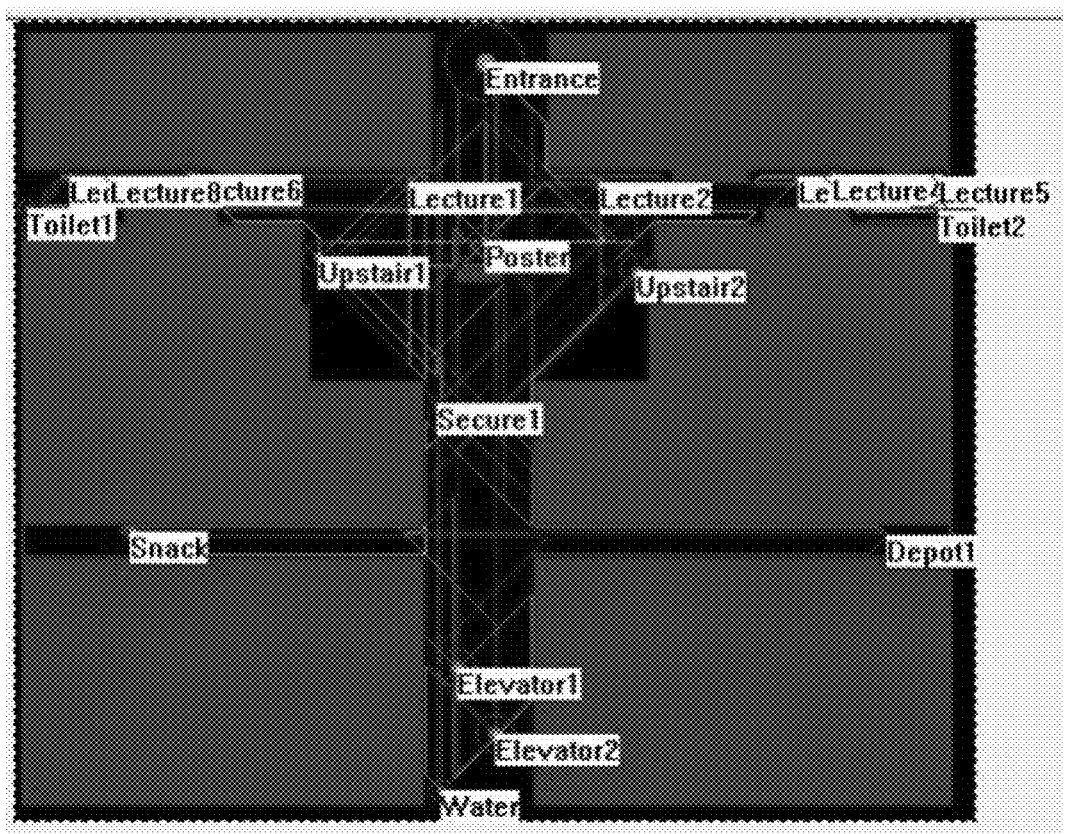
FIG. 4 is a diagram illustrating an agent's movement pattern modeled by the automatic vision sensor placement apparatus of FIG. 1 based on an A* algorithm according to an exemplary embodiment of the present disclosure.

FIG. 4 is a diagram illustrating an agent's movement pattern modeled by the automatic vision sensor placement apparatus 100 of FIG. 1 based on the A* algorithm according to an exemplary embodiment of the present disclosure.

As mentioned above, a path found using the A* algorithm is greatly different from various paths actually traveled by a user. To reduce the difference between them, the present invention additionally applies a path expansion algorithm.

An agent's pathfinding algorithm finds a path using the A* algorithm, infers areas, to which a user is expected to move in a walkable space around the found path, based on the path expansion algorithm, and updates information needed to extract a priority area.

Figure 5:
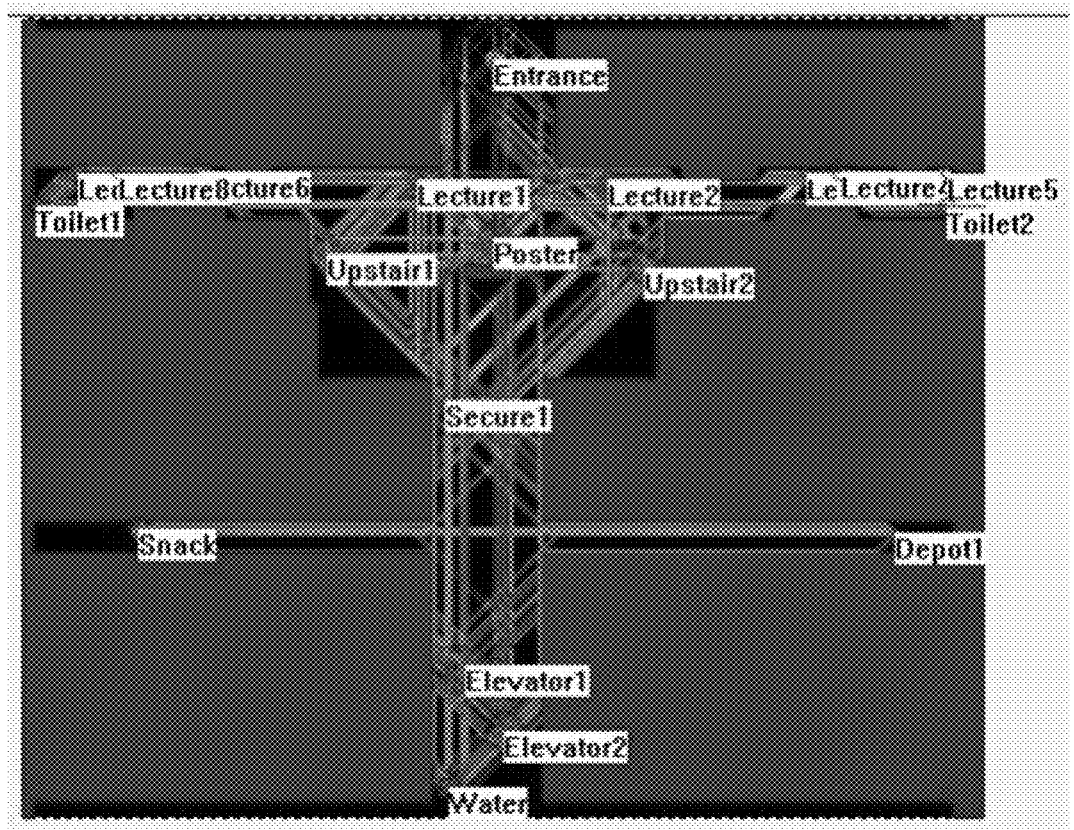
FIG. 5 is a diagram illustrating an agent's movement pattern modeled by the automatic vision sensor placement apparatus of FIG. 1 based on a path expansion algorithm according to an exemplary embodiment of the present disclosure.

FIG. 5 is a diagram illustrating an agent's movement pattern modeled by the automatic vision sensor placement apparatus 100 of FIG. 1 based on the path expansion algorithm according to an exemplary embodiment of the present disclosure.

An inference process of the path expansion algorithm is as follows:

1. Identify a range r1 of an area around a specified starting point and a range r2 of an area around a specified destination based on the area attribute information.
2. Calculate the number n of starting points within the range r1 of the area around the specified starting point and determine the positions of the n starting points.
3. Calculate the number m of destinations within the range r2 of the area around the specified destination and determine the positions of the m destinations.
4. Find (n+1)×(m+1) additional paths by applying the A* algorithm to the (n+1) starting points including the specified starting point and to the (m+1) destinations including the specified destination.
5. Find grid cells surrounded by lines of the additional paths and add the found grid cells as additional areas.
6. Return grid cells for all additional paths and the grid cells found in step 5 as additional areas.

To select locations at which vision sensors (such as cameras) are to be placed, a greedy strategy algorithm is used.

Based on the greedy strategy algorithm, a priority area is extracted based on space priority information contained in the area attribute information of the space modeling unit 110 and path information obtained using an agent's pathfinding algorithm. Then, a location at which a vision sensor is to be placed is selected in the extracted priority area.

According to the greedy strategy's property of making a choice based only on current state information, all coordinate points on a space model are examined, and a coordinate point having a highest priority in the field of view (FOV) of a camera is selected as a location at which the camera is to be placed.

Figure 6:
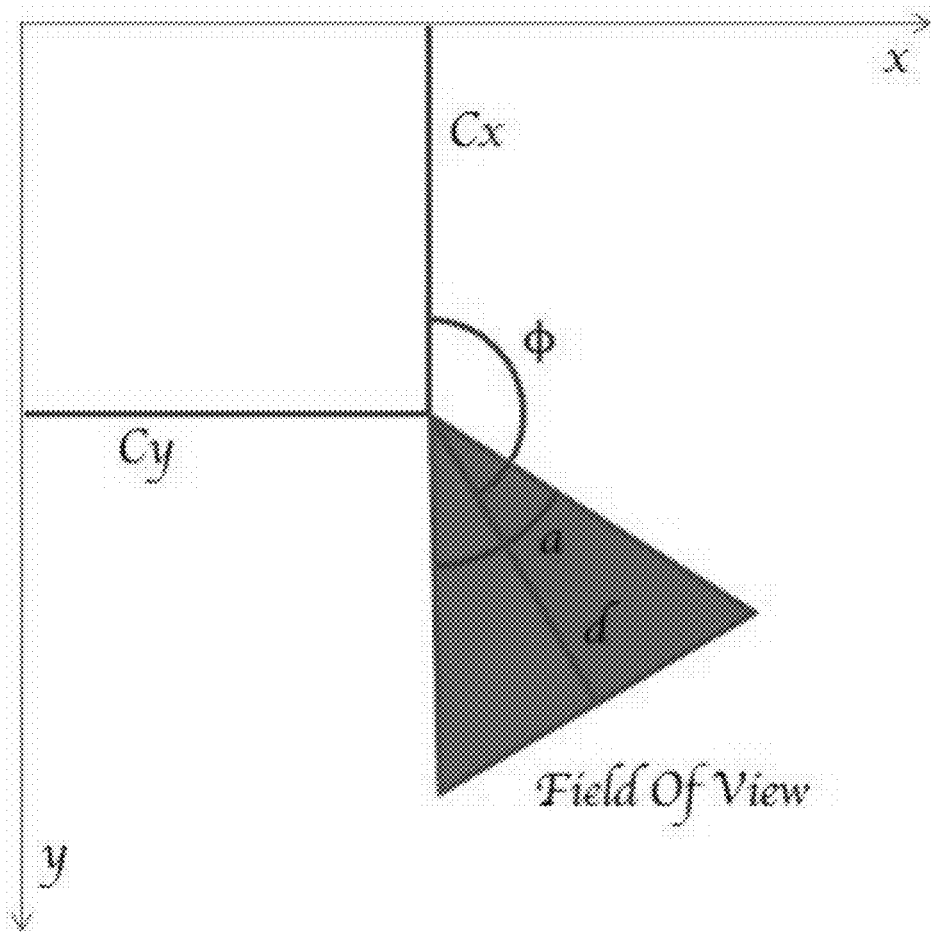
FIG. 6 is a diagram illustrating the field of view (FOV) of a vision sensor modeled according to an exemplary embodiment of the present disclosure.

FIG. 6 is a diagram illustrating the FOV of a vision sensor modeled according to an exemplary embodiment of the present disclosure.

Referring to FIG. 6, a camera's FOV has a minimum structure that does not consider the connection of the camera to a vision system.

The FOV of the camera has a triangular structure which includes, as parameters, a viewing distance and an available angle with respect to the position of the camera.

The position of one vision camera is represented by X and Y integer coordinates on a 2D grid map, and the vision camera has a position angle of maximum 360 degrees at a fixed position.

Therefore, in a simulation environment, the FOV of a vision camera is determined by four factors, i.e., the position (Cx, Cy), position angle Φ, viewing distance d, and available angle a of the vision camera.

The optimal position of a camera is determined based on the suitability of the camera at each coordinate point. Here, the suitability of the camera varies according to the space priority of a priority area, the cost and performance of the camera, and the like.

The suitability of a camera at each coordinate point according to the type of the camera is given by $$\text{Suitability} = \frac{\text{Priority Value in FOV of Camera}_n}{\text{Cost of Camera}_n}. \quad (2)$$

Suitability is calculated based on a maximum sum that can be obtained at a specified coordinate point on a grip map among sums of space priority values of cells within a virtual FOV of a camera for all directions and angles. That is, suitability is calculated based on maximum space priority coverage that can be obtained at the position of a specified cell on a grid map.

A value obtained by dividing the maximum space priority coverage by the cost of the camera is defined as suitability.

Of various types of cameras set by a simulator, a camera having a highest suitability value in a specified cell may be a low-cost and high-performance camera.

From all cells on a suitability map that is created, cells in which a camera is to be placed are selected in order of highest to lowest suitability of the camera. Then, a predetermined range from the position of a selected cell on the suitability map is reconfigured upon the installation of the camera.

Figure 7A:
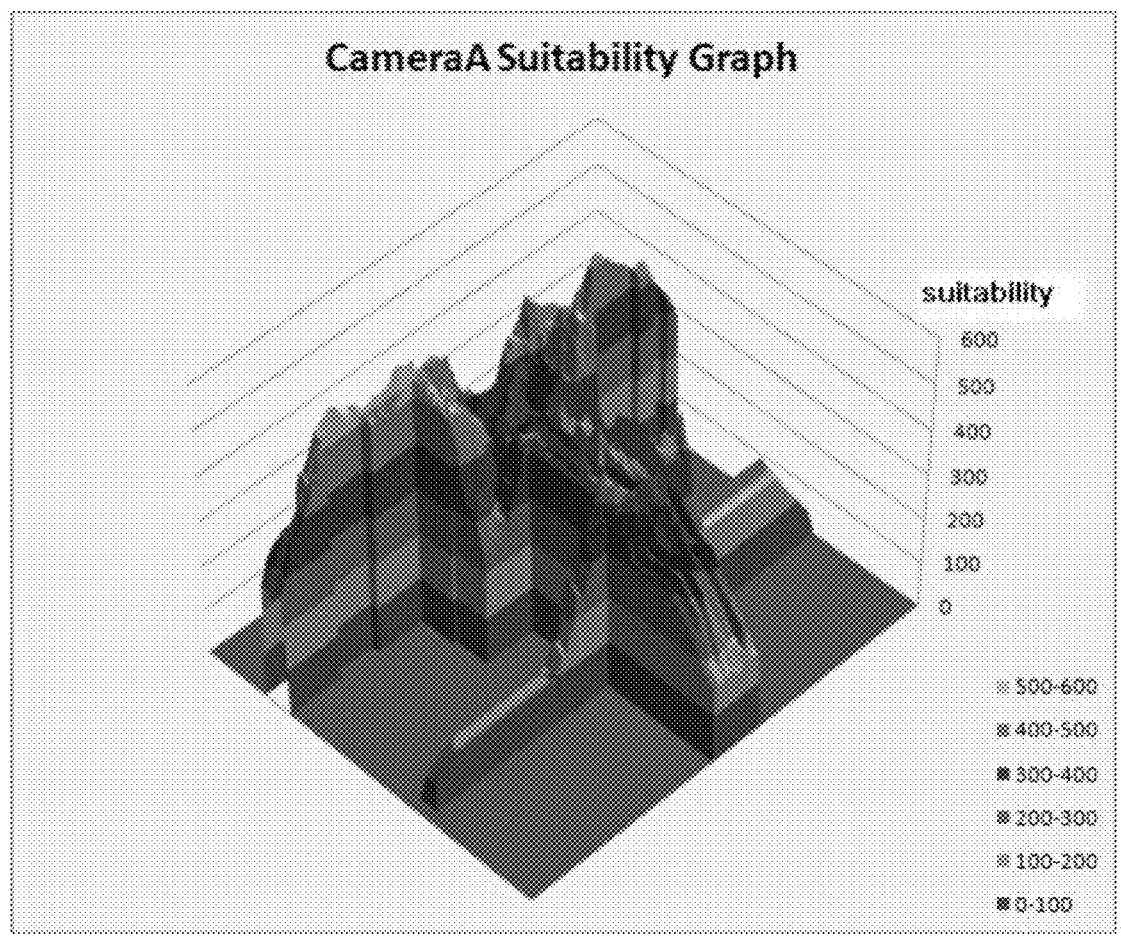
FIGS. 7A and 7C are diagrams illustrating suitability extracted by the automatic vision sensor placement apparatus of FIG. 1 according to an exemplary embodiment of the present disclosure.
Figure 7B:
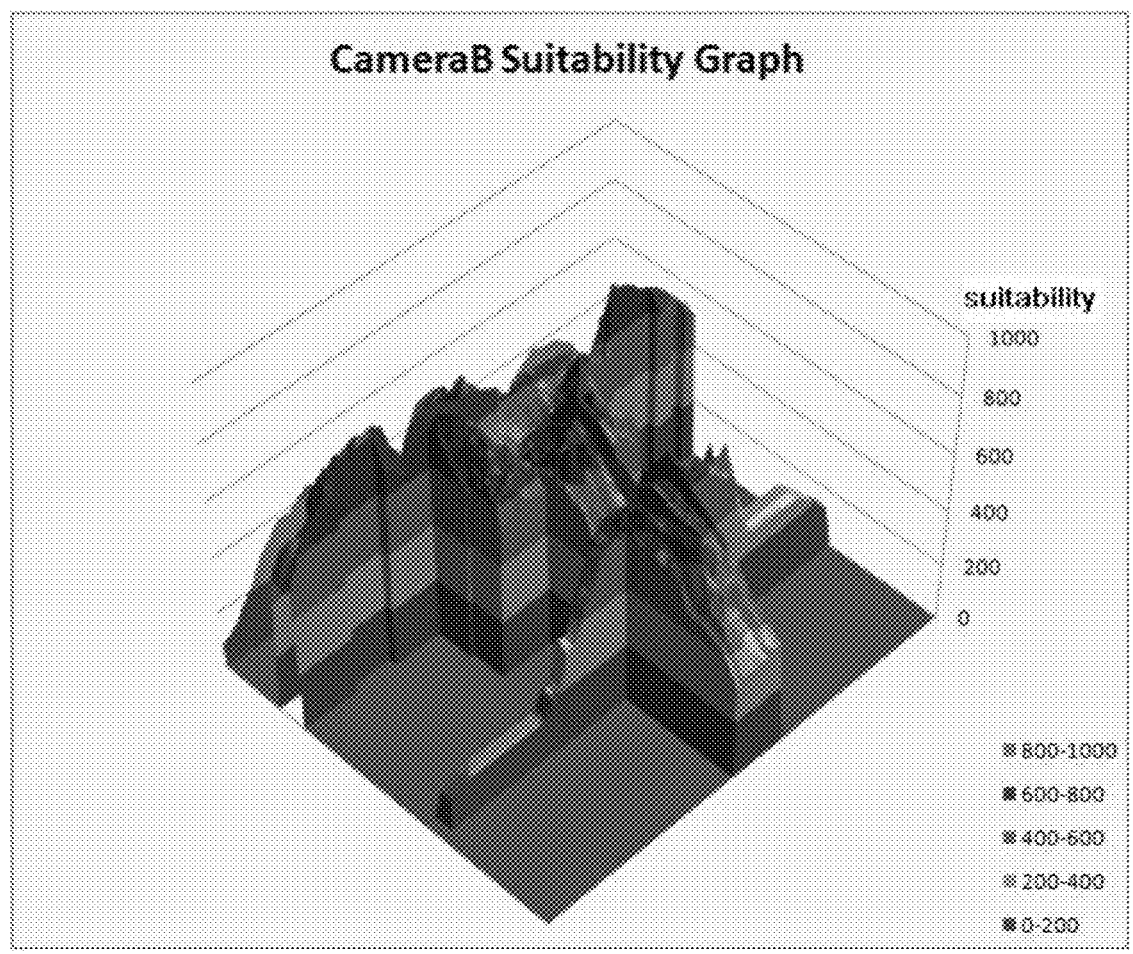
Figure 7C:
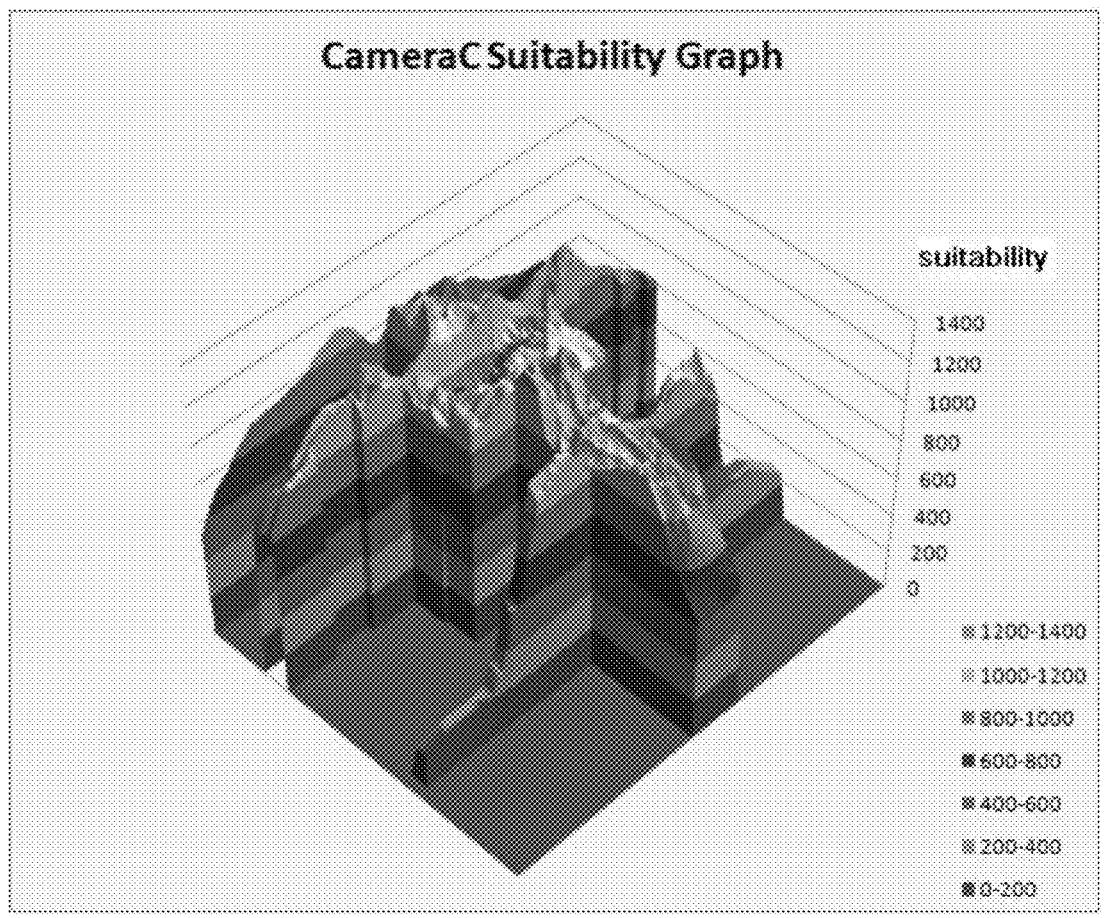

FIGS. 7A and 7C are diagrams illustrating suitability extracted by the automatic vision sensor placement apparatus 100 of FIG. 1 according to an exemplary embodiment of the present disclosure. Specifically, FIGS. 7A through 7C are diagrams illustrating suitability extracted according to three types of cameras.

To model the FOV of each camera, the viewing distance d, available angle a, and cost c of each camera are used as variables.

The performance of each camera is shown in Table 1 below.

TABLE 1

|  | Viewing distance | Available angle | Cost |
| --- | --- | --- | --- |
| Camera A | 60 grid cells | 60° | 80 |
| Camera B | 90 grid cells | 450° | 120 |
| Camera C | 120 grid cells | 60° | 200 |

A camera placement algorithm using the greedy algorithm calculates suitability in view of the placement cost of each type of camera in each cell on a grid map and the maximum sum of space priorities.

A suitability map for a camera is continuously updated until an optimal number of cameras to be placed is finally set.

An initial suitability map for each camera is shown in FIGS. 7A through 7C.

FIG. 7A is a graph illustrating the placement suitability of camera A, FIG. 7B is a graph illustrating the placement suitability of camera B, and FIG. 7C is a graph illustrating the placement suitability of camera C.

If a camera can cover all space priorities updated on the priority layer of an input space in its FOV, the placement of the camera can be completed. However, 100% space priority coverage does not ensure the optimal placement of the camera.

The optimal placement of a camera is an uncertain criterion that may vary according to conditions such as an environment, resources, and the like. Thus, in the present disclosure, (1) a placement cost limit (for calculating a maximum number of cameras to be placed which does not exceed the placement cost limit) and (2) set minimum space priority coverage (for calculating a minimum number of cameras to be placed which satisfies the set minimum space priority coverage) are calculated to determine the optimal number of cameras to be placed.

When necessary, the number of cameras to be placed may be calculated based on resources or the range of an area that can be monitored by a camera. A camera placement algorithm is performed as follows.

1. Create a suitability map based on the greedy strategy and in view of the proportion of space covered by the FOV of a camera in the entire map space and the cost of the camera.
2. Select a coordinate point having a highest suitability value on the suitability map.
3. Place the camera at the selected coordinate point and update a camera placement list.
4. Terminate camera placement when it is determined that an optimal number of cameras has been placed.
5. Recalculate the suitability around the position of the camera on the suitability map.
6. Return to step 2.

Figure 8A:
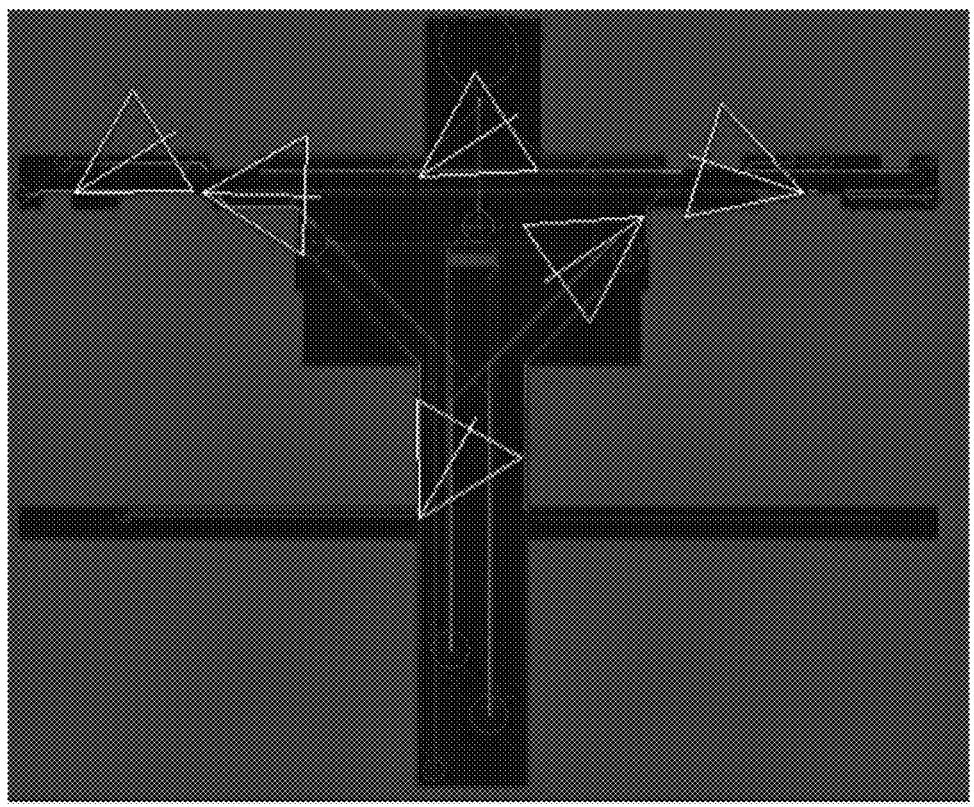
FIGS. 8A through 8C are diagrams illustrating camera placement positions that meet a camera placement cost limit set by the automatic vision sensor placement apparatus of FIG. 1 according to an exemplary embodiment of the present disclosure.
Figure 8B:
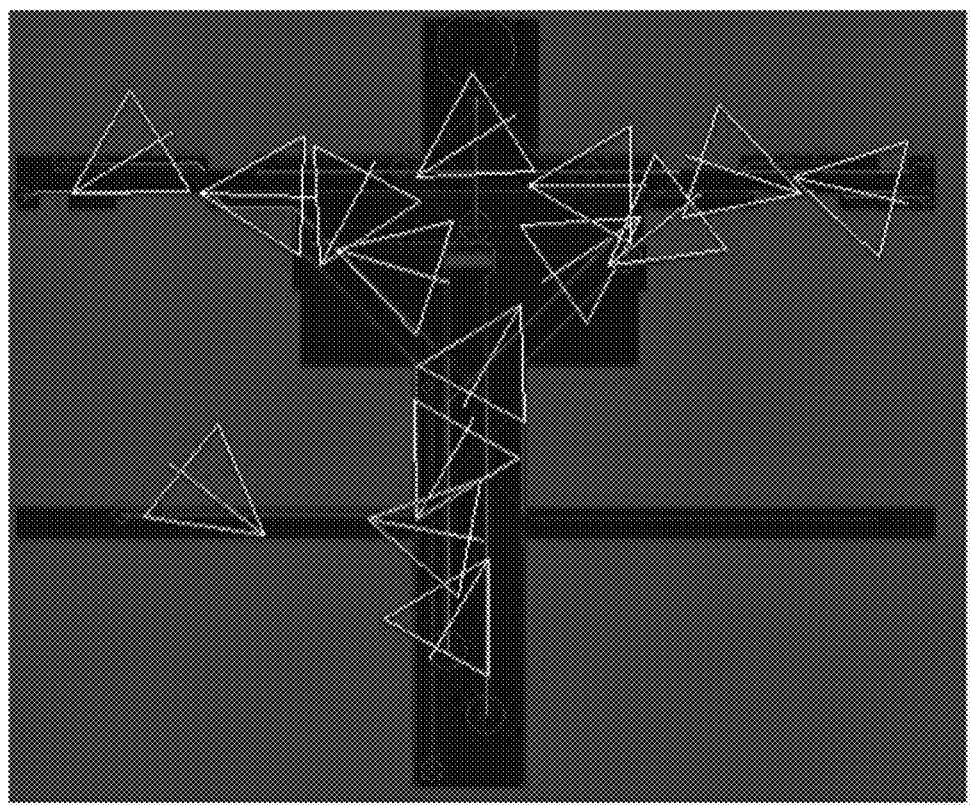
Figure 8C:
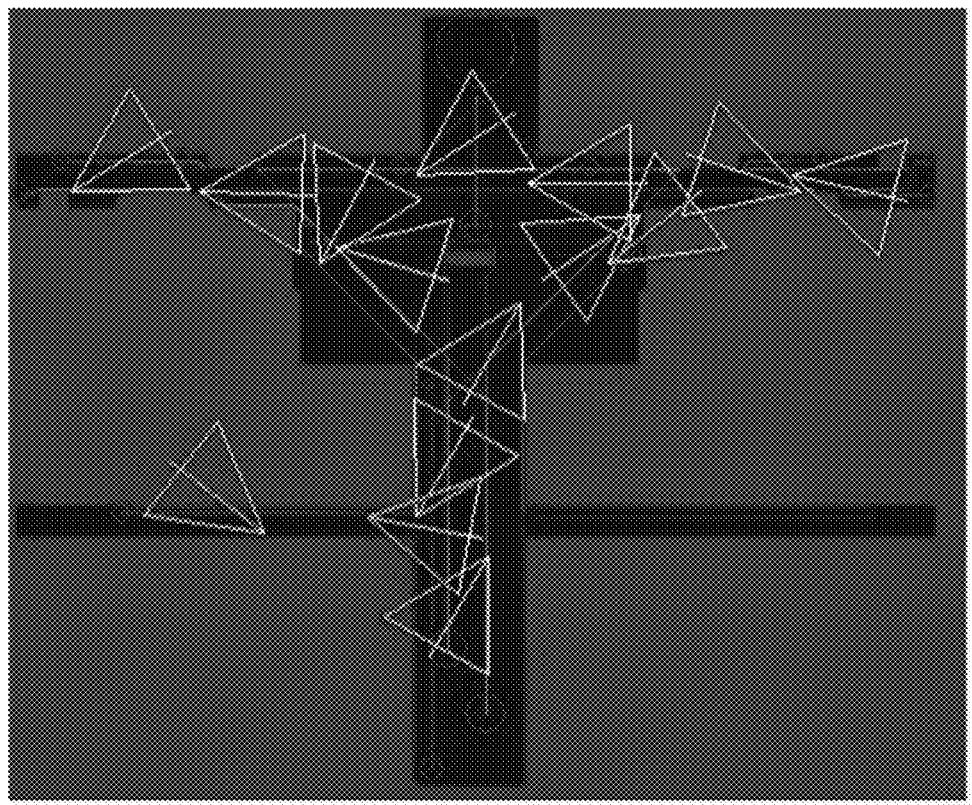

FIGS. 8A through 8C are diagrams illustrating camera placement positions that meet a camera placement cost limit set by the automatic vision sensor placement apparatus 100 of FIG. 1 according to an exemplary embodiment of the present disclosure.

Specifically, FIG. 8A illustrates camera placement when the camera placement cost limit is 5 million won, FIG. 8B illustrates camera placement when the camera placement cost limit is 12 million won, and FIG. 8C illustrates camera placement when the camera placement cost limit is 15 million won.

Figure 9A:
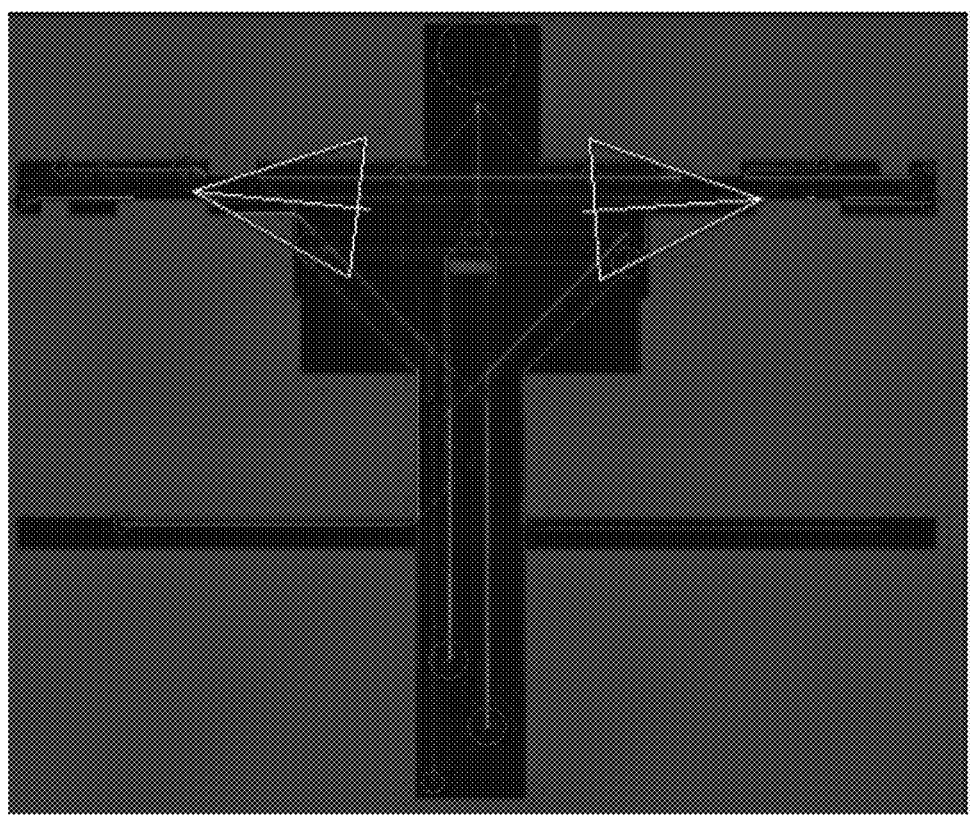
FIGS. 9A through 9C are diagrams illustrating camera placement positions that meet minimum space priority coverage requirements set by the automatic vision sensor placement apparatus of FIG. 1.
Figure 9B:
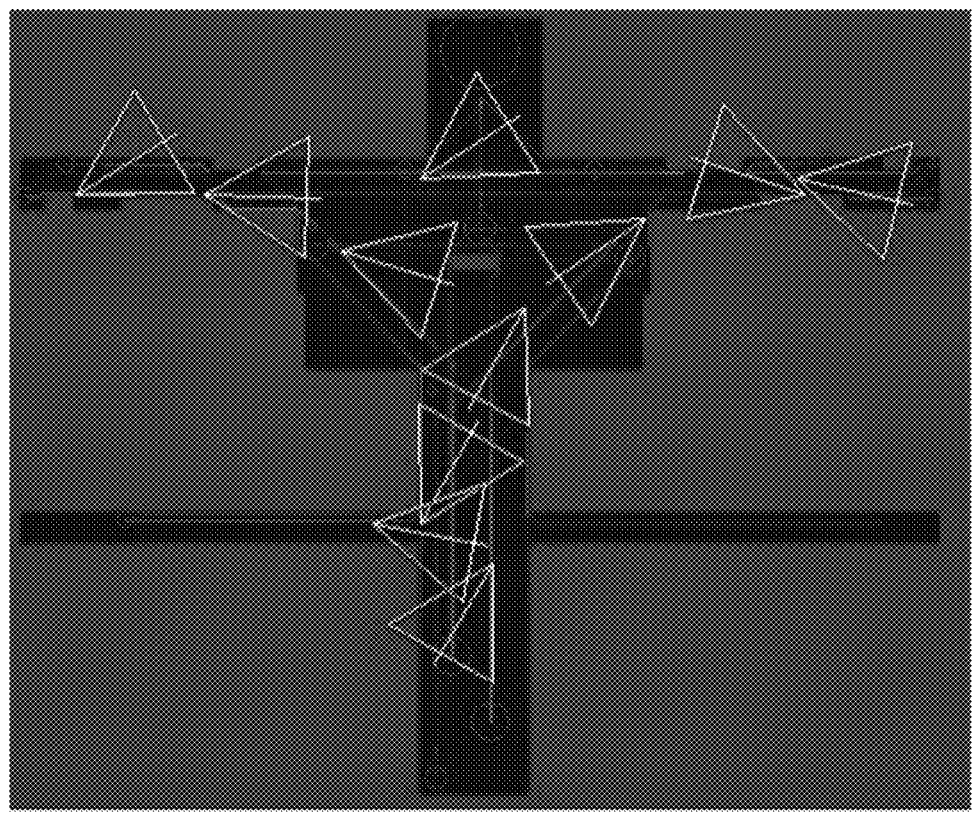
Figure 9C:
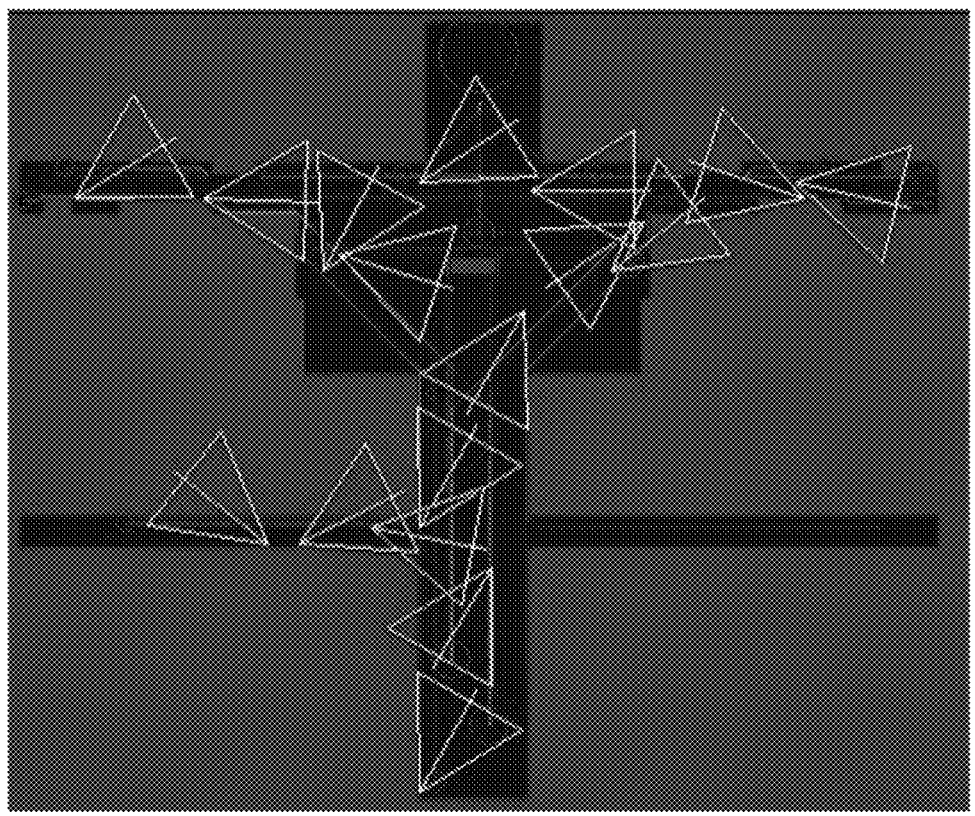

FIGS. 9A through 9C are diagrams illustrating camera placement positions that meet minimum space priority coverage requirements set by the automatic vision sensor placement apparatus 100 of FIG. 1.

FIG. 9A illustrate camera placement when the minimum space priority coverage is 20%, FIG. 9B illustrates camera placement when the minimum space priority coverage is 60%, and FIG. 9C illustrates camera placement when the minimum space priority coverage is 80%.

Figure 10:
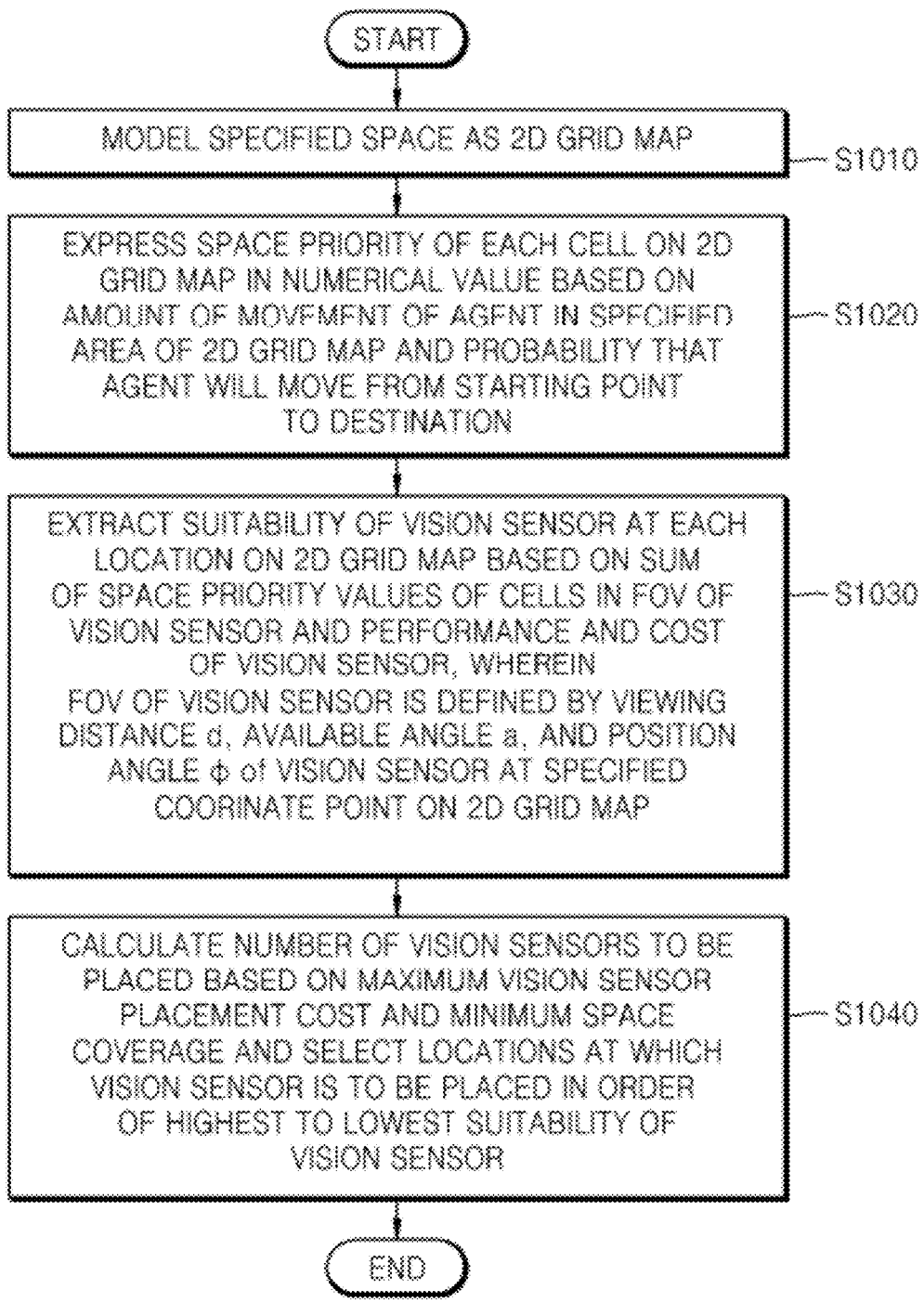
FIG. 10 is a flowchart illustrating an automatic vision sensor placement method according to the present disclosure.

FIG. 10 is a flowchart illustrating an automatic vision sensor placement method according to the present disclosure.

Referring to FIG. 10, a specified space is modeled as a 2D grid map (operation S1010).

The space priority of each cell on the 2D grid map is expressed in a numerical value based on the amount of movement of an agent in a specified area of the 2D grid map and a probability that the agent will move from a starting point to a destination (operation S1020).

The suitability of a vision sensor at each location on the 2D grid map is extracted based on the sum of space priority values of cells in an FOV of the vision sensor and the performance and cost of the vision sensor (operation S1030). Here, the FOV of the vision sensor is defined by the viewing distance d, available angle a, and position angle Φ of the vision sensor at a specified coordinate point on the 2D grid map.

The number of vision sensors to be placed is calculated based on a maximum vision sensor placement cost and minimum space coverage, and locations at which the vision sensor is to be placed are selected in order of highest to lowest suitability of the vision sensor (operation S1040). Here, the minimum space coverage refers to the proportion of a minimum area that can be monitored by a vision sensor in the specified space.

An automatic vision sensor placement apparatus and method according to the present disclosure provide a basis for the determination of a service-centered and theorized camera placement position, which goes beyond non-objective space design constrained by the performance and use algorithm of a vision sensor in constructing a conventional ubiquitous intelligent vision surveillance system. Accordingly, the automatic vision sensor placement apparatus and method have the effect of providing an intelligent video surveillance system that is independent from a vision device and a vision algorithm.

The automatic vision sensor placement apparatus and method according to the present disclosure also provide an efficient method for determining appropriate camera positions and an appropriate number of cameras to be installed in view of installation cost.

While the present disclosure has been particularly shown and described with reference to exemplary embodiments thereof, it will be understood by those of ordinary skill in the art that various changes in form and details may be made therein without departing from the spirit and scope of the present invention as defined by the following claims.

The foregoing description of the embodiments has been provided for purposes of illustration and description. It is not intended to be exhaustive or to limit the invention. Individual elements or features of a particular embodiment are generally not limited to that particular embodiment, but where applicable, are interchangeable and can be used in a selected embodiment, even if not specifically shown or described. The same may also be varied in many ways. Such variations are not to be regarded as a departure from the invention, and all such modifications are intended to be included within the scope of the invention.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

What is claimed is:

1. An automatic vision sensor placement method comprising:
    modeling a specified space as a 2D grid map;
    expressing the space priority of each cell of the grid map in a numerical value based on an amount of movement of an agent in a first area of the grid map and a probability that the agent will move from the first area to a second area;
    extracting the suitability of a vision sensor at each location on the grid map based on a sum of space priority values of cells within a field of view (FOV) of the vision sensor and a performance and cost of the vision sensor; and
    calculating a number of vision sensors to be placed based on a maximum vision sensor placement cost and minimum space coverage and selecting locations, at which the vision sensor is to be placed, in order of highest to lowest suitability of the vision sensor,
    wherein the FOV of the vision sensor is defined by a viewing distance d, available angle a, and position angle Φ of the vision sensor at a specified coordinate point, and the minimum space coverage is the proportion of a minimum area that can be monitored by the vision sensor in the specified space,
    wherein the modeling of the specified space comprises:
        creating a wall or space layer that separate a walkable space from a non-walkable space in the specified space;

creating an area layer which contains information about an amount of movement of a user in the first area of the 2D grid map, a probability that the user will move from the first area to the second area, and a center coordinate and a radius of each of the first area and the second area; and creating a priority layer which represents extracted space priority values of the cells on the grid map, wherein the movement of the agent from the first area to the second area is modeled using an A* search algorithm which is based on a shortest and least-cost path and a path expansion algorithm, and wherein the path expansion algorithm comprises:

identifying a range r1 of an area around a specified starting point and a range r2 of an area around a specified destination based on the area attribute information;

calculating a number n of starting points within the range r1 of the area around the specified starting point and determining the positions of the n starting points;

calculating a number m of destinations within the range r2 of the area around the specified destination and determining the positions of the m destinations;

finding (n+1)×(m+1) additional paths by applying the A* algorithm to the (n+1) starting points including the specified starting point and to the (m+1) destinations including the specified destination;

finding grid cells surrounded by lines of the additional paths and add the found grid cells as additional areas;

returning grid cells for all additional paths and the grid cells as additional areas; and adjusting a space priority value included in the searched path.

2. The method of claim 1, wherein the vision sensor is a camera.

3. The method of claim 1, wherein the A* search algorithm is based on a heuristic search algorithm and a graph search algorithm.

* * * * *